(12) United States Patent
Asavoae et al.

(10) Patent No.: US 12,248,787 B2
(45) Date of Patent: Mar. 11, 2025

(54) METHOD AND ELECTRONIC DEVICE FOR MONITORING EXECUTABLE CODE ADAPTED TO BE EXECUTED ON A COMPUTER PLATFORM, AND COMPUTER PROGRAM IMPLEMENTING SUCH A METHOD

(71) Applicant: Commissariat à l'énergie atomique et aux énergies alternatives, Paris (FR)

(72) Inventors: Mihail Asavoae, Gif sur Yvette (FR); Mathieu Jan, Gif sur Yvette (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 432 days.

(21) Appl. No.: 17/655,243

(22) Filed: Mar. 17, 2022

(65) Prior Publication Data

US 2022/0308885 A1    Sep. 29, 2022

(30) Foreign Application Priority Data

Mar. 25, 2021  (FR) .................................... 21 03046

(51) Int. Cl.
  *G06F 9/38* (2018.01)
  *G06F 11/36* (2006.01)
  *G06F 11/3604* (2025.01)
(52) U.S. Cl.
  CPC .......... *G06F 9/3838* (2013.01); *G06F 9/3897* (2013.01); *G06F 11/3608* (2013.01)
(58) Field of Classification Search
  CPC ... G06F 9/3838; G06F 9/3897; G06F 11/3608
  See application file for complete search history.

(56) References Cited

U.S. PATENT DOCUMENTS

| 9,811,434 B1 * | 11/2017 | Wagner | G06F 11/3006 |
| 2013/0097463 A1 * | 4/2013 | Marvasti | H04L 41/142 714/47.1 |

(Continued)

OTHER PUBLICATIONS

Martijn Hendriks et al., "Analyzing execution traces: critical-path analysis and distance analysis," 2016 [retrieved on Nov. 13, 2024], International Journal on Software Tools for Technology Transfer, col. 19, pp. 487-510, downloaded from <url>:https://link.springer.com. (Year: 2016).*

(Continued)

*Primary Examiner* — S. Sough
*Assistant Examiner* — Stephen D Berman
(74) *Attorney, Agent, or Firm* — Oblon, McClelland, Maier & Neustadt, L.L.P.

(57) ABSTRACT

A computer-implemented method for monitoring an executable code having a sequence of software instructions. The method includes acquiring the sequence and generating a first modeling structure of an execution path of the sequence, the first structure having first data groups, each associated with a respective instruction and including identifiers of preceding and following instructions. A second modeling structure of an operation of the sequence is constructed by going through the first groups, the second structure having second data groups, each associated with a respective instruction and including an indicator of possibly belonging to a critical chain. A critical chain corresponds to instructions of a same software function and is computed by solving a subgraph problem with degree restraints, each critical chain corresponding to a subgraph. The method also includes searching for runtime anomaly/anomalies from critical chain(s) determined via the second structure.

16 Claims, 5 Drawing Sheets

(56) References Cited

U.S. PATENT DOCUMENTS

2019/0196939 A1* 6/2019 Lengauer ............ G06F 11/3006
2023/0343084 A1* 10/2023 Urabe ..................... G06F 11/34

OTHER PUBLICATIONS

French Preliminary Search Report issued Nov. 29, 2021 in French Application 21 03046 filed on Mar. 25, 2021, 3 pages (with English Translation of Categories of Cited Documents).
Lu et al., "Data-driven Anomaly Detection with Timing Features for Embedded Systems", ACM Transactions on Design Automation of Electronic Systems, vol. 24, No. 3, 2019, 27 pages.
Anantaraman et al., "Virtual Simple Architecture (VISA): Exceeding the Complexity Limit in Safe Real-Time Systems", Proceedings of the $30^{th}$ Annual International Symposium on Computer Architecture (ISCA'03), 2003, 12 pages.
Gabow, "An Efficient Reduction Technique for Degree-Constrained Subgraph and Bidirected Network Flow Problems", Proceedings of the Seventh Symposium on Data Communications, 1983, 9 pages.

* cited by examiner

METHOD AND ELECTRONIC DEVICE FOR MONITORING EXECUTABLE CODE ADAPTED TO BE EXECUTED ON A COMPUTER PLATFORM, AND COMPUTER PROGRAM IMPLEMENTING SUCH A METHOD

CROSS-REFERENCE TO RELATED APPLICATIONS

This application is a U.S. non-provisional application claiming the benefit of French Application No. 21 03046, filed on Mar. 25, 2021, which is incorporated herein by reference in its entirety.

FIELD

The present invention relates to a method for monitoring an executable code adapted to be executed on a computer platform, the executable code comprising a sequence of software instructions, the method being implemented by an electronic monitoring device.

The invention also relates to a non-transitory computer-readable medium including a computer program comprising software instructions that implements such a monitoring method, when executed by a computer.

The invention also relates to such an electronic device for monitoring executable code adapted to be executed on a computer platform.

The invention relates to the field of monitoring executable codes comprising sequences of software instructions adapted to be executed on computer platforms, in particular monitoring the execution of sequences of instructions expressed in machine language, directly interpretable by the computer platform.

BACKGROUND

The article "Formal Executable Models for Automatic Detection of Timing Anomalies" by M. Asavoae, B. Ben Hedia, and M. Jan, WCET 2018, teaches that a timing anomaly of an instruction sequence is a counterintuitive runtime behavior of that sequence in the sense that fast local execution slows down overall execution. The presence of such behaviors is troublesome for a worst-case execution time (WCET) analysis, which requires a certain monotonicity in the execution order of instructions in order to be able to compute safe limit values.

However, this article does not teach how to detect runtime anomalies automatically in given computer architecture designs, in particular in given sequences of machine language instructions.

SUMMARY

The object of the invention is then to propose a method and a related electronic device for monitoring an executable code comprising a sequence of software instructions, adapted to be executed on a computer platform, making it possible to detect runtime anomalies automatically.

To this end, the subject-matter of the invention is a method for monitoring an executable code adapted to be executed on a computer platform, the executable code comprising a sequence of software instructions, the method being implemented by an electronic monitoring device and comprising the following steps:
acquiring the sequence of software instructions;
generating a first modeling structure of an execution path of the sequence of instructions, the first structure being generated from the sequence of instructions and comprising a plurality of first groups of data, each associated with a respective software instruction; each first group comprising an identifier of a previous instruction and an identifier of a following instruction;
calculating a second modelling structure of an operation of the sequence of instructions, the second structure comprising a plurality of second groups of data, each associated with a respective software instruction; each second group comprising an indicator of possible belonging to a critical chain of instructions, and, in the case of belonging to a respective critical chain, an identifier of an initial instruction of said critical chain; the second structure being created from the first structure, by successively going through the first groups of the first structure; a respective critical chain corresponding to instructions of a same software function and being computed by solving a subgraph problem with degree constraints, each critical chain corresponding to a subgraph, the number of instructions included in each critical chain being less than or equal to a predefined maximum number, and an optimization parameter being the number of relationships between the instructions of the respective critical chain, said number of relationships corresponding to a number of arcs in the related subgraph; and
searching for runtime anomaly/anomalies from critical chain(s) of instructions determined via the second modeling structure.

According to further advantageous aspects of the invention, the monitoring method comprises one or more of the following features, taken alone or in any technically possible combination:

during the calculation step, for each software instruction belonging to a respective critical chain, each second group further comprises a pre-context field and a post-context field; the pre-context field including the identifier of each instruction preceding the instruction associated with said second group and not belonging to the critical chain of which said instruction is a part, and the post-context field including the identifier of each instruction succeeding the instruction associated with said second group and not belonging to the critical chain of which said instruction is a part;

in the calculation step, a scope field is added for each respective critical chain of instructions in the second modeling structure, the scope field including a a memory access count from all instructions in said critical chain;

in the calculation step, a pre-context variable and a post-context variable are added for each respective instruction critical chain in the second modeling structure, the pre-context variable being equal to the most frequent identifier of the instruction identifiers contained in the pre-context fields for said critical chain, and the post-context variable being equal to the most frequent identifier of the instruction identifiers contained in the post-context fields for said critical chain;

each first group further comprises a runtime quantification of an execution of the respective software instruction, and each second group further comprises at least a runtime quantification of an execution path of the sequence to said respective instruction; the runtime quantification of the execution of the respective software instruction preferably being a number of clock cycles for said execution.

each runtime quantification of an execution path to the respective software instruction is calculated from the pre-context field for said instruction and the execution runtime quantifications for said respective instruction and for the instructions identified in the pre-context field;

the method further comprises a step of propagating runtime quantification data from a previous critical chain of instructions to a current critical chain of instructions, the runtime quantifications associated with the current critical chain being determined from those associated with the previous critical chain;

during the search step, a runtime anomaly is detected in the event of inconsistency between the runtime quantifications associated with the current critical chain and those associated with the previous critical chain;

a first runtime quantification included in the second group is a runtime quantification of a shorter execution path between an initial instruction of the sequence and the respective instruction; and a second runtime quantification included in the second group is a runtime quantification of a longer execution path between said initial instruction and the respective instruction;

the computer platform comprises a plurality of instruction execution units, and each first group further comprises an identifier of the execution unit associated with the respective software instruction;

each first group further comprises information on possible dependency with other instructions, such as a register identifier common with said other instructions and/or a memory area identifier common with said other instructions; and the sequence of software instructions is a sequence of instructions expressed in machine language, directly interpretable by the computer platform.

The invention also relates to a non-transitory computer-readable medium including a computer program comprising software instructions that implement a monitoring method as defined above when executed by a computer.

The invention also concerns an electronic device for monitoring an executable code adapted to be executed on a computer platform, the executable code comprising a sequence of software instructions, the device comprising:

an acquisition module configured to acquire the sequence of software instructions;

a generation module configured to generate a first modeling structure of an execution path of the sequence of instructions, the first structure being generated from the sequence of instructions and comprising a plurality of first groups of data, each associated with a respective software instruction; each first group comprising an identifier of a previous instruction and an identifier of a next instruction;

a calculation module configured to calculate a second structure for modelling an operation of the sequence of instructions, the second structure comprising a plurality of second data groups, each associated with a respective software instruction; each second group comprising an indicator of possible belonging to a critical chain of instructions, and, in the case of belonging to a respective critical chain, an identifier of an initial instruction of said critical chain; the second structure being created from the first structure, by successively going through the first groups of the first structure; a respective critical chain corresponding to instructions of a same software function and being computed by solving a subgraph problem with degree constraints, each critical chain corresponding to a subgraph, the number of instructions included in each critical chain being less than or equal to a predefined maximum number, and an optimization parameter being the number of relationships between the instructions of the respective critical chain, said number of relationships corresponding to a number of arcs in the related subgraph; and a search module configured to search for one or more runtime anomalies from critical chains of instructions determined via the second modeling structure.

BRIEF DESCRIPTION OF THE DRAWINGS

These features and advantages of the invention will become clearer upon reading the following description, given only as a non-limiting example, and made with reference to the appended drawings, in which.

DETAILED DESCRIPTION

Figure 1:
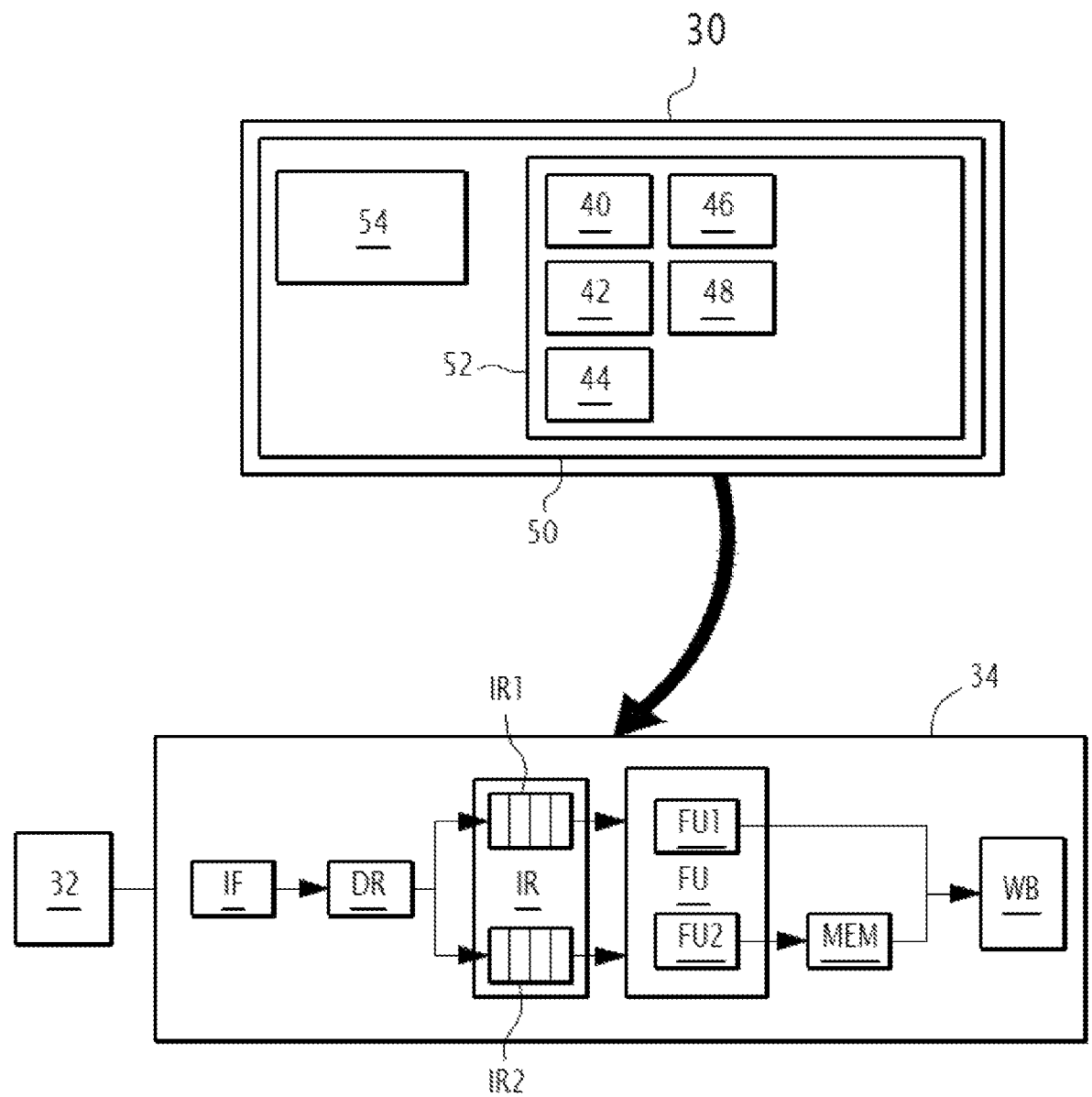
FIG. 1 is a schematic representation of a computer platform adapted to execute an executable code, and an electronic device for monitoring said executable code.

In FIG. 1, an electronic monitoring device 30 is configured to monitor an executable code 32 adapted to be executed on a computer platform 34, the executable code 32 comprising a sequence of software instructions.

The electronic monitoring device 30 comprises an acquisition module 40 for acquiring the sequence of software instructions forming the executable code 32 to be monitored; a generation module 42 for generating a first modeling structure of an execution path of the sequence of instructions; a calculation module 44 for calculating a second modeling structure of an operation of the sequence of instructions; and a search module 46 for searching for one or more runtime anomalies from critical chain(s) of instructions determined via the second modeling structure.

As an optional addition, the electronic monitoring device 30 comprises a propagation module 48 for propagating runtime quantification data from one critical chain of instructions to the next.

In the example shown in FIG. 1, the electronic monitoring device 30 comprises a data processing unit 50 formed by a memory 52 and a processor 54 associated with the memory 52, for example.

The executable code 32 includes the sequence of software instructions, and the sequence of software instructions is a sequence of instructions expressed in machine language directly interpretable by the computer platform 34, for example.

The computer platform 34 typically includes a plurality of instruction execution units, such as a first instruction execution unit, also called the first functional unit FU1, and a second instruction execution unit, also called the second functional unit FU2.

In the example of FIG. 1, the computer platform 34 has a pipelined or cascaded architecture. In this example of FIG. 1, the computer platform 34 comprises six successive stages, namely a first stage, instructing to fetch (Instruction Fetch) IF; a second stage, instructing to decode and reorder (Decode Reorder) DR, connected to the output of the first instruction fetch stage IF; a third stage, instructing to register (Instruction Register) IR connected to the output of the second stage DR; a fourth stage, to execute instructions (Functional Unit) FU, comprising the first and second functional units FU1, FU2 and connected to the output of the third instruction register stage IR; a fifth stage, to access the memory (MEMory access) MEM, with this stage being useful only for executing loading and storage instructions and only connected to the output of the second functional unit FU2 in the example of FIG. 1, for example, and a sixth stage of storing the result WB (Write Back), the sixth stage being connected to the output of the first functional unit FU1 on the one hand, and to the fifth memory access stage MEM on the other hand, which is itself connected to the output of the second functional unit FU2.

The first stage, instructing to fetch (Instruction Fetch) is known per se, and suitable for receiving and then successively reading each of the instructions of the sequence of instructions forming the executable code 32 intended to be executed by the computer platform 34.

The second stage, instructing to decode and reorder DR is also known per se, and is adapted to prepare the arguments of the instructions for subsequent execution of the instruction by one of the functional units FU1, FU2.

The third stage, instructing to register IR typically comprises an instruction register for each functional unit of the fourth execution stage. In the example of FIG. 1, the third stage IR then comprises two instruction registers, namely a first instruction register IR1 associated with the first execution unit FU1 and connected as input thereto, and a second instruction register IR2 associated with the second instruction execution unit FU2 and connected as input thereto.

The first instruction execution unit FU1 is typically adapted to execute arithmetical and logical instructions, also called ALU instructions, or branch and jump instructions, and the second instruction execution unit FU2 is adapted to execute load and store instructions, for example, with the second instruction execution unit FU2 then being connected to the input of the memory access stage MEM for this purpose.

The memory access stage MEM is only useful for load and store instructions, and, as known per se, makes it possible to read the value to store in the register concerned, in the case of a store instruction, or the value read from memory to be stored in the case of a load instruction.

The stage of storing the result WB is finally adapted to store the result of the execution of the corresponding software instruction in the destination register, to store the result of arithmetic and logic operations performed by the first execution unit FU1, for example, or to store the value read from memory by the load instructions in the destination register, or a new address in the case of branch instructions.

Figure 2:
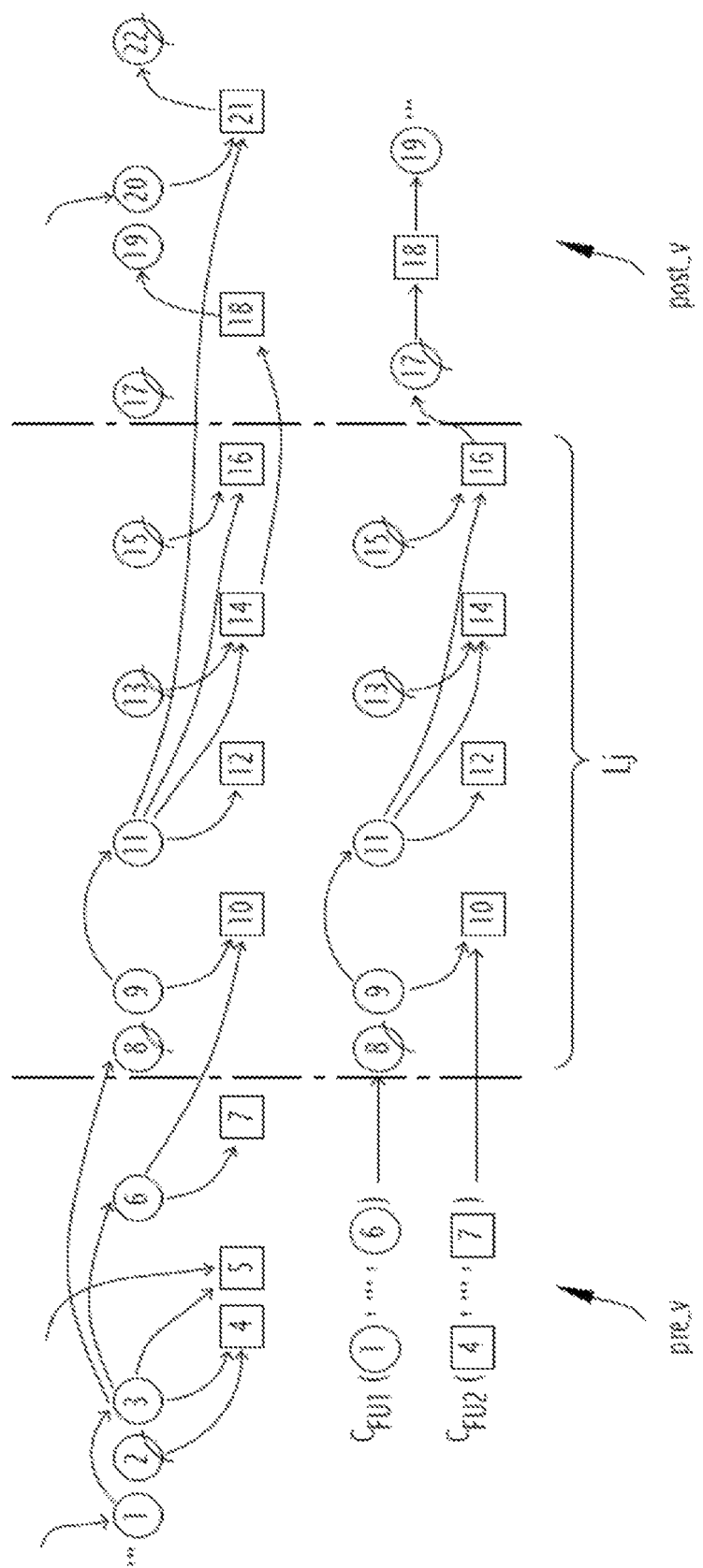
FIG. 2 is an illustration of an example of a directed acyclic graph showing a sequence of software instructions forming the executable code monitored by the monitoring device of FIG. 1.

The sequence of software instructions is a succession of software instructions adapted to be executed successively by the computer platform 34. In the example of FIG. 2, the sequence of software instructions comprises twenty-two software instructions numbered from 1 to 22, with the software instructions adapted to be executed by the first execution unit FU1 shown in a circular manner, and the software instructions adapted to be executed by the second execution unit FU2 shown in a rectangular manner. The instructions that can be executed by the first execution unit FU1 are typically ALU-type instructions, shown as a circle in FIG. 2, or branch and jump instructions, shown as a circle intersected by an arc in the lower right-hand portion in FIG. 2. The software instructions adapted to be executed by the second execution unit FU2 are typically memory access instructions, such as load and store instructions, shown as a rectangle in FIG. 2.

The software instructions shown in FIG. 2 then correspond to the instructions listed below, for example:

| 1.  | jr ra              | FU1 |
|-----|--------------------|-----|
| 2.  | jal ra, −56        | FU1 |
| 3.  | addi sp, −32       | FU1 |
| 4.  | sdsp ra, 24(sp)    | FU2 |
| 5.  | sdsp s0, 16(sp)    | FU2 |
| 6.  | addi4spn s0, sp, 32| FU1 |
| 7.  | sw zero −20(s0)    | FU2 |
| 8.  | jal ra, −256       | FU1 |
| 9.  | addi sp, −32       | FU1 |
| 10. | sdsp s0, 23(sp)    | FU2 |
| 11. | addi4spn s0, sp, 32| FU1 |
| 12. | sw zero, −20(s0)   | FU2 |
| 13. | li a5, −1          | FU1 |
| 14. | sw a5, −24(s0)     | FU2 |
| 15. | li a5, −1          | FU1 |
| 16. | sw a5, −28(s0)     | FU2 |
| 17. | J 62               | FU1 |
| 18. | lw a5, −24(s0)     | FU2 |
| 19. | addiw a5, 0        | FU1 |
| 20. | bnez a5, −66       | FU1 |
| 21. | lw a4, −20(s0)     | FU2 |
| 22. | slli a4, 2         | FU1 |

The skilled person will observe that the instructions listed above are then instructions expressed in machine language, directly interpretable by the computer platform 34. The instructions listed above, in this case and as known per se, are RISC-V type instructions.

The skilled person will observe in the above example that the instructions jr, jal, j and bnez are branch and jump instructions, adapted to be executed by the first execution unit FU1; the instructions addi, li, addiw, slli and addi4spn are ALU instructions, adapted to be executed by the first execution unit FU1; and the instructions sdsp, sw and lw are load or sore instructions, adapted to be executed by the second execution unit FU2.

In the example of FIG. 2, the relationships between software instructions are shown as arrows or oriented arcs, noting that the relationships between two successive software instructions are not necessarily shown, for the sake of simplifying the drawing.

In the example of FIG. 1, the acquisition module 40, the generation module 42, the calculation module 44 and the search module 46 as well as optionally the propagation module 48 each take the form of software, a software block, executable by the processor 54. The memory 52 of the electronic monitoring device 30 is then adapted to store software for acquiring the sequence of software instructions forming the executable code to be monitored, software for generating the first modelling structure of the execution path of the sequence of instructions, software for calculating the second modelling structure of the operation of the sequence of instructions and software for searching for runtime anomaly/anomalies from the critical chain(s) of instructions determined via the second modelling structure. As an optional addition, the memory 52 of the electronic monitoring device 30 is adapted to store software for propagating runtime quantification data from one respective critical chain of instructions to the next. The processor 54 is then adapted to execute each of the acquisition software, the generation software, the calculation software and the search software and, optionally, the propagation software as well.

In a variant and not shown, the acquisition module 40, the generation module 42, the calculation module 44 and the search module 46, as well as optionally the propagation module 48, each take the form of a programmable logic component such as a Field Programmable Gate Array (FPGA), or an integrated circuit such as an Application Specific Integrated Circuit (ASIC).

When the electronic monitoring device 30 is implemented as one or more software programs, i.e. as a computer program, also called a computer program product, it is further adapted to be recorded on a computer-readable medium, not shown. The computer-readable medium is a medium capable of storing electronic instructions and of being coupled to a computer system bus, for example. The readable medium is an optical disk, for example, a magneto-optical disk, a ROM memory, a RAM memory, any type of non-volatile memory (such as EPROM, EEPROM, FLASH, NVRAM), a magnetic card or an optical card. A computer program comprising software instructions is then stored on the readable medium.

The acquisition module 40 is configured to acquire the sequence of software instructions forming the executable code 32. The acquired sequence of software instructions is typically a sequence of instructions expressed in machine language, directly interpretable by the computer platform 34.

The generation module 42 is configured to generate the first structure for modeling the execution path of the instruction sequence, the first structure being generated from the instruction sequence acquired by the acquisition module 40 and comprising a plurality of first data groups, each associated with a respective software instruction.

Each first group associated with a respective software instruction includes an identifier of a previous software instruction of said respective instruction and an identifier of a following software instruction of said respective instruction, within the sequence of instructions forming the executable code 32.

For the generation of the first modeling structure, the generation module 42 is configured to go through an execution path of the sequence of instructions, for example, typically at the binary level, i.e. in machine language, and to determine the identifier of each preceding instruction, for each software instruction, as well as the identifier of each following instruction.

In addition, each first group also comprises a runtime quantification of an execution of the respective software instruction, this runtime quantification being expressed as a number of clock cycles for said execution, for example, or even as an interval of values of numbers of clock cycles for said execution between a minimum and maximum value of the number of possible clock cycles for executing the respective software instruction. In other words, this runtime quantification of execution of the respective software instruction, also called the execution latency, is expressed as a single value of the number of clock cycles, or as an interval of values of the number of clock cycles.

As an optional addition, each first group further includes an identifier of the execution unit associated with the respective software instruction, such as an identifier indicating the related execution unit, either the first execution unit FU1 or the second execution unit FU2 in the example of FIGS. 1 and 2.

As a further optional addition, each first group further comprises information on possible dependency with other software instructions, such as an identifier of a register common to said other software instructions and/or an identifier of a memory area common to said other software instructions.

Each first group takes the form of a data word or message, for example, where each of the identifiers or information included in the first group then takes the form of a respective field of that data word.

The calculation module 44 is configured to calculate the second structure for modeling the operation of the sequence of instructions, the second structure comprising a plurality of second data groups, each associated with a respective software instruction.

Each second group takes the form of a data word or message, for example, where each of the elements included in the second group is then in the form of a respective field of that data word.

Each second group of data typically includes an indicator of possible membership in a critical chain of instructions, also called a hot point, and, in case of belonging to a respective hot point, an identifier of an initial instruction of said hot point. The indicator of possible membership in the hot point is marked with the acronym is_local, for example, and the identifier of the initial instruction of the hot point is marked with the name start, for example.

The calculation module 44 is typically configured to calculate the second modeling structure from the first modeling structure generated by the generation module 42, by successively going through the first groups of the first structure.

Each respective critical chain corresponds to instructions of the same software function, and the calculation module 44 is configured to compute each respective critical chain by solving a Degree Constrained Subgraph Problem (DCSP), with each critical chain corresponding to a subgraph, the number of instructions in each critical chain being less than a predefined maximum number and an optimization parameter of said problem being the number of relationships between the instructions of the respective critical chain, with said number of relationships then corresponding to a number of directed arcs in the related subgraph.

The solution of DCSP problems is known per se, and is described in the article by Y. Shiloach, "*Another look at the degree constrained subgraph problem*", for example, published in 1981, or in the article by O. Amini et al., "*On the approximability of some degree-constrained subgraph problems*", published in 2012.

The predefined maximum number of instructions contained in each critical chain is, for example, chosen based on a parameter of the pipelined architecture of the computer platform 34, based on a number of instructions to be contained in the entire pipeline of the computer platform 34, for example, or based on the number of instructions to be contained in one of the stages of said platform 34, such as in the third instruction register stage IR or even in the fourth instruction execution stage FU.

In the example of FIG. 2, the predefined maximum number of instructions of the critical chain is equal to 9, and the critical chain $L_j$ corresponds to the software instructions 8 to 16, and, for this critical chain of instructions, the optimization parameter here is equal to 19, corresponding to the sum of all the relationships between instructions 8 to 16 of said chain, also called internal relationships, of incoming relationships to the instructions of said chain, i.e. relationships between instructions upstream of said chain and said instructions of the chain, and outgoing relationships of said chain, i.e. relationships between an instruction of said chain and a software instruction downstream of said chain.

For each critical chain determined via the resolution of the DCSP problem, the calculation module 44 is configured to set the membership indicator is_local associated with each software instructions included in the determined critical chain to a true value, such as the Boolean value 1 or even the TRUE value, and also to populate, as initial instruction identifier start and for each software instruction included in the determined critical chain, the identifier of the first software instruction of the critical chain thus determined.

In other words, after having determined a respective critical chain, the calculation module 44 is configured to populate the membership indicator is_local and the initial instruction identifier start for each of the software instructions forming the determined critical chain, and in an identical manner for each instruction, the membership indicator is_local being set to the true value, and the initial instruction identifier start being populated with the identifier of the first instruction of the respective chain.

As an optional addition, for each software instruction belonging to a respective critical chain, the calculation module 44 is further configured to calculate a pre-context field, also noted pre_v, and a post-context field, also noted post_v, the pre-context field pre_v including the identifier of each instruction preceding the instruction associated with said second group and not belonging to the critical chain of which said instruction is a part, and the post-context field post_v including the identifier of each instruction succeeding the instruction associated with said second group and not belonging to the critical chain of which said instruction is a part.

As a further optional addition, for each software instruction, the calculation module 44 is configured to calculate at least one runtime quantification of an execution path to said respective instruction, the at least one execution path runtime quantification being included in the second group associated with the respective instruction.

According to this optional addition, the calculation module 44 is typically configured to calculate each runtime quantification of an execution path to the respective software instruction from the pre-context field pre_v for said instruction and the runtime quantifications for the instructions identified in that pre_v pre-context field, and from the runtime quantification of said respective instruction, i.e. its execution latency.

According to this optional addition, for example, the calculation module 44 is configured to calculate a first runtime quantification of a shortest execution path to said respective instruction for each software instruction i.e. a runtime quantification of the shortest execution path between an initial instruction of the sequence and the respective instruction, the first runtime quantification being also noted sh and included in the second group associated with said instruction.

The calculation module 44 is configured to calculate the first runtime quantification sh for the respective instruction from previously calculated first runtime quantifications for the instructions identified in the pre_v pre-context field of said instruction, i.e. for the instructions preceding said instruction following the possible execution paths, and from the execution latency of said instruction.

The calculation module 44 is configured to calculate the first runtime quantification sh for said respective instruction, for example, from the minimum of the first runtime quantifications calculated for the instructions identified in the pre-context field pre_v of the respective software instruction, and from the execution latency of said instruction. The first runtime quantification sh for said respective instruction is preferably equal to the sum of the minimum of the first runtime quantifications computed for the instructions identified in the pre-context field pre_v of the respective software instruction and the execution latency of said instruction.

The first runtime quantification sh then verifies the following equation, for example:

$$sh(j)=\min\{sh(i)/i\in\text{pre}\_v(j)\}+\text{Inf}(\text{lat}(j)) \qquad [\text{Math 1}]$$

where sh(j) represents the first runtime quantification for the software instruction of index j, min represents the minimum function, sh(i) represents each first runtime quantification for a software instruction of index i belonging to the pre_v(j) pre-context field of the instruction of index j, each sh(i) then corresponding to the first runtime quantification for a respective instruction preceding the instruction of index j, Inf represents the lower limit function, and lat(j) represents the execution latency of the instruction of index j.

The skilled person will observe that when the execution latency of the instruction of index j is in the form of an interval of values of numbers of clock cycles, then the lower limit is equal to the minimum value of this values interval i.e. of this range of values. In a variant, when the execution latency of the instruction of index j is expressed as a given number of clock cycles for said execution, then the lower limit of said execution latency is equal to said given number of clock cycles.

According to this optional addition, the calculation module 44 is also configured to calculate a second runtime quantification corresponding to the runtime quantification of a longer execution path to said respective instruction, i.e., the longer execution path between the initial instruction of the sequence and the respective instruction, the second runtime quantification also being noted lo and included in the second group associated with said instruction.

The calculation module 44 is configured to calculate the second runtime quantification for the respective instruction from previously calculated second runtime quantifications for the instructions identified in the pre_v pre-context field of said instruction and from the execution latency of said instruction.

The calculation module 44 is configured, for example, to calculate the second runtime quantification lo for said respective instruction from the maximum of the second runtime quantifications calculated for the instructions identified in the pre-context field pre_v of the respective software instruction and from the execution latency of said instruction. The second runtime quantification lo for said respective instruction is preferably equal to the sum of the maximum of the second runtime quantifications computed for the instructions identified in the pre-context field pre_v of the respective software instruction and the execution latency of said instruction.

The second runtime quantification lo for the respective instruction then verifies the following equation, for example:

$$lo(j)=\text{Max}\{lo(i)/i \in \text{pre}\_v(j)\}+\text{Sup}(\text{lat}(j)) \qquad [\text{Math 2}]$$

where lo(j) represents the second runtime quantification for the software instruction of index j, Max represents the maximum function, lo(i) represents each second runtime quantification for a software instruction of index i belonging to the pre_v(j) pre-context field of the instruction of index j, where each lo(i) corresponds to the second runtime quantification for a respective instruction preceding the instruction of index j, Sup represents the upper limit function, and lat(j) represents the execution latency of the instruction of index j.

The skilled person will similarly observe that when the execution latency of the instruction of index j is in the form of a range of values of numbers of clock cycles, then the upper limit is equal to the maximum value of this range of values. In a variant, when the execution latency of the instruction of index j is expressed as a given number of clock cycles for said execution, then the upper limit of said execution latency is equal to said given number of clock cycles.

As an optional addition, the calculation module 44 is configured to calculate a scope field, also called the scope, for each determined critical instruction chain, and to then include said scope in the second modeling structure. The calculation module 44 is configured to calculate the scope for said respective critical chain based on memory accesses made from all instructions in said critical chain, the scope showing a range, or magnitude, of memory accesses made from said critical chain.

According to this optional addition, the scope includes a value equal to the number of memory accesses performed by all the instructions of said critical chain, for example. In addition or in a variant, the scope is a function of cache misses associated with the instructions of said critical chain, a cache miss being counted as a predefined number of memory accesses, this predefined number of memory accesses typically having a value strictly greater than 1, in order to take cache misses other than simple memory accesses into account in said scope. A cache miss is counted as equal to 10 memory access cycles, for example.

The scope then enables to prioritize between several calculated critical chains, especially when several critical chains are associated with the same respective software function. The selected critical chain is then the one for which the scope value, showing the extent of the memory accesses performed by the respective critical chain, is the highest.

As a further optional addition, the calculation module 44 is configured to calculate a variability field var for each respective instruction critical chain, and to then include said variability field var in the second modeling structure. The variability field var includes a pre-context variable equal to the most frequent of the instruction identifiers contained in the pre-context fields pre_v for said critical chain; and a post-context variable equal to the most frequent of the instruction identifiers contained in the post-context fields post_v for said respective critical chain.

The variability field var then identifies a critical entry point of the critical chain via the pre-context field pre_v for said critical chain, and/or identifies a critical exit point of said critical chain via the post-context field post_v. For example, the pre-context field pre_v provides input values that are useful for fully exploring the critical chain, using the aforementioned procedure, and the post-context field post_v provides the output values observed from full exploration of the critical chain. Thus, the variability field var captures input-output runtime relationships at the critical chain level.

As an addition, the variability field var is taken into account when propagating the runtime quantification data from one chain to the following chain. According to this addition, the post-context field post_v of the critical chain $L_j$ is propagated to the following critical chain $L_{j+1}$, this post-context field post_v of the critical chain $L_j$ being taken into account in determining the pre-context field pre_v of the following critical chain $L_{j+1}$, for example.

The search module 46 is configured to search for one or more runtime anomalies from critical chain(s) of instructions determined via the second modeling structure. A runtime anomaly is detected if there is an inconsistency between the runtime quantifications associated with a current critical chain and the runtime quantifications associated with a subsequent critical chain. The search module 46 is then typically configured to search for inconsistencies between the runtime quantifications sh, lo of two successive critical chains. For example, an inconsistency between the runtime quantifications associated with two successive critical chains corresponds to the case where the longest execution path corresponding to a second runtime quantification associated with a respective critical chain does not include the software instructions of the previous critical chain i.e. does not pass through the previous critical chain.

A runtime anomaly during execution of the sequence of software instructions is a counter-intuitive runtime behavior during execution of this sequence, typically corresponding to a break in the monotonicity of the runtime evolution of the execution of the sequence, this then being due to fast local execution slowing down overall execution.

A break in the monotonicity of the runtime evolution of the execution of the sequence of software instructions is typically due to the presence of one or more cache misses associated with one or more of the software instructions. In other words, the presence of such cache misses is likely to result in the occurrence of a timing anomaly.

Figure 4:
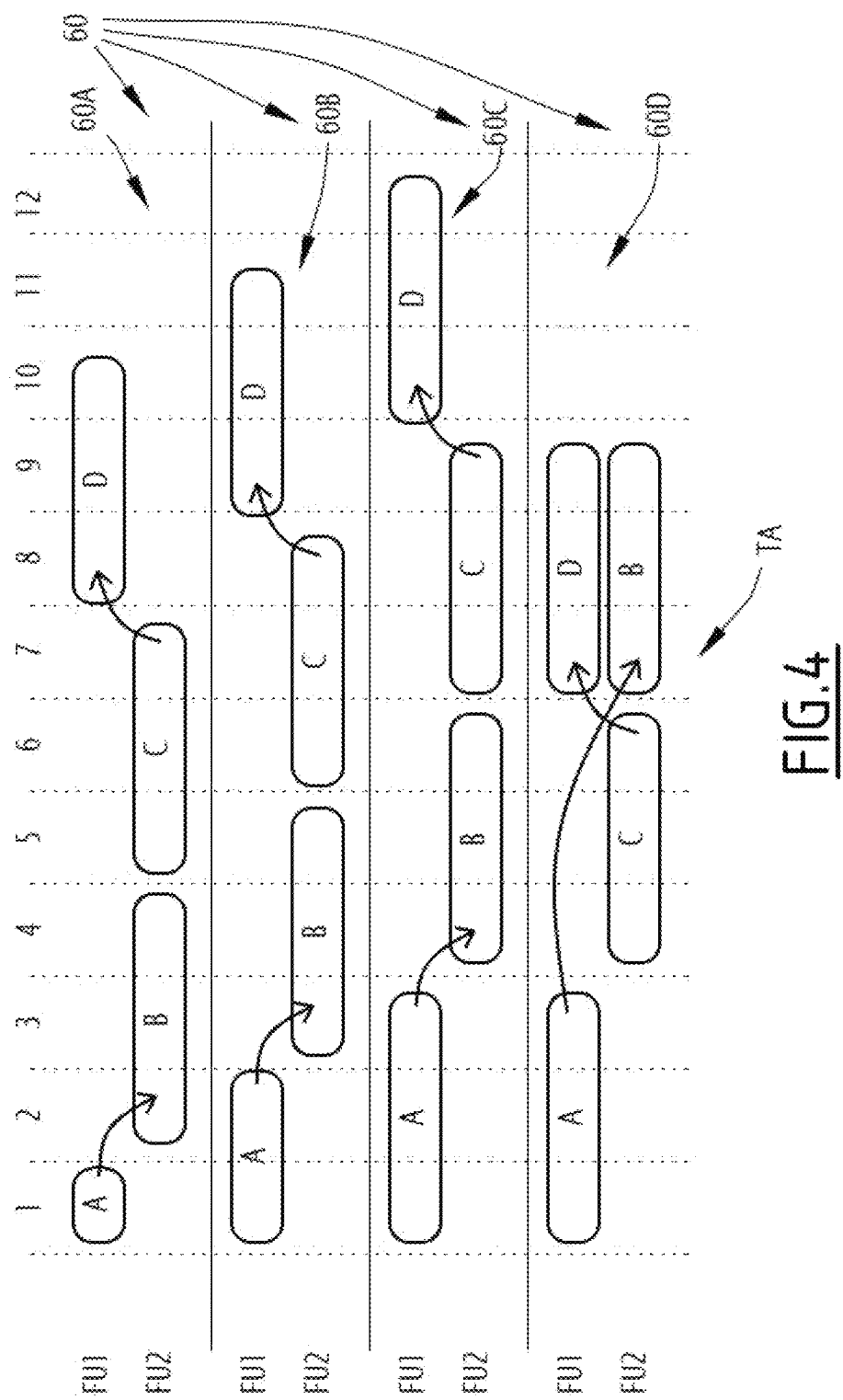
FIG. 4 is a schematic representation of four chronograms of execution of a sequence of four instructions A to D, during different executions by the platform of FIG. 1, comprising two execution units in parallel, the fourth chronogram corresponding to a runtime anomaly.

A break in the monotonicity of the runtime evolution is illustrated as an example in FIG. 4. In the example of FIG. 4, four execution paths 60, namely a first 60A, second 60B, third 60C and fourth 60D execution path are shown in parallel in the context of executing a sequence formed by four software instructions A, B, C, and D, where instructions A and D are intended to be executed by the first execution unit FU1, and software instructions B and C are intended to be executed by the second execution unit FU2.

In this example of FIG. 4, the execution time of the sequence increases progressively from the first execution path 60A, shown at the top of FIG. 4, and for which the execution of the sequence is performed in ten clock cycles numbered 1 to 10, until the third execution path 60C, this third execution path 60C corresponding to an execution of the sequence in twelve clock cycles numbered 1 to 12. The skilled person will then observe that the increase in execution time between the first 60A and third 60C paths is due to a progressive increase in the execution time of the software instruction A by the first execution unit FU1, this being equal to one clock cycle for the first execution path 60A, then two clock cycles, numbered 1 and 2 for the second execution path 60B, and, finally, three clock cycles for the third execution path 60C. The fourth execution path 60D, shown at the bottom of FIG. 4, then presents a time anomaly timing anomaly (TA), since the overall execution time of the sequence then corresponds to nine clock cycles, numbered 1 to 9, i.e. the execution time of the shortest sequence of the four execution paths 60 shown in FIG. 4, while the execution time of the software instruction A for this fourth execution path 60D is equal to the execution time of the software instruction A for the third execution path 60C, and is strictly greater than the execution time of the software instruction A for each of the first 60A and second 60B execution paths.

It is then observed in this example of FIG. 4 that the time anomaly TA is due to the fact that the software instruction C, for this fourth execution path 60D, is executed before the software instruction D by the second execution unit FU2, and that the last software instruction D of the sequence is then executed by the first execution unit FU1 in parallel with the execution of the software instruction B by the second execution unit FU2. The execution of the last software instruction D is then completed at the end of cycle 9, at the same time as that of the software instruction B, and this shortening of the overall execution time of the sequence then generates a break in the monotonicity of the evolution of the execution time of said sequence, characteristic of the runtime anomaly TA to be detected.

As an optional addition, the propagation module 48 is configured to propagate runtime quantification data from a current critical chain of instructions to the following critical chain of instructions, the runtime quantifications associated with the following critical chain then being determined from those associated with the current critical chain.

For propagation of the runtime quantification data from one chain to the following chain, for example, the propagation module 48 is configured to compute at least one limit value 70, 80 representative of an overall execution runtime quantification of the current critical chain, such as the critical chain $L_j$, in order to then propagate it to the following critical chain, such as the critical chain $L_{j+1}$.

The propagation module 48 is configured, for example, to compute a first limit value 70 corresponding to a shortest overall execution path of the critical chain, this first limit value 70 being noted Lj.sh for the critical chain $L_j$, for example; and a second limit value 80 corresponding to a longest overall execution path for the critical chain, this second limit value 80 being noted Lj.lo for the critical chain $L_j$, for example.

According to this optional addition, the propagation module 48 is configured to compute the at least one limit value 70, 80, for example, by applying a model checking algorithm to the current critical chain, such as the critical chain $L_j$ i.e. by implementing said model checking algorithm for said current critical chain.

The model checking algorithm is known per se, and is described, for example, in the document entitle "*Model checking (second edition)*" by E. Clarke et al., MIT Press, 2018, and is based on a Kripke structure making it possible to model a transition system, such as the respective critical chain. The Kripke structure typically has a 4-fold form (S, S0, R, L) in which S is a set of a finite number of states, S0 is the set of initial values of the states in the set S, R is a transition relation on the states in the set S and L is a function of labeling the states in the set S into logical formulas, i.e. a function of interpreting said states in the set S into logical formulas.

For applying the model checking algorithm to the respective critical chain, and in particular for implementation of the Kripke structure for said critical chain, the propagation module 48 is then configured to fill the -tuple S0 corresponding to the set of initial values of the states with the pre-context field pre_v, and the model checking algorithm then makes it possible to explore the set of execution paths for said critical chain, this set of execution paths corresponding to the -tuple S, or in other words each state of the set S corresponding to a possible execution of the software instructions of the critical chain, as described for example in the article "*Formal executable models for automatic detection of timing anomalies*" by M. Asavoae et al., WCET 2018.

The propagation module 48 is then configured to calculate the first and second limit values 70, 80 for the current critical chain, such as the values Lj.sh and Lj.lo for the critical chain $L_j$ by implementing the model checking algorithm for said current critical chain, such as the critical chain $L_j$; and then to propagate the one or more limit values 70, 80 thus calculated to the following critical chain, such as the critical chain $L_{j+1}$.

The propagation module 48 is configured to perform said propagation of runtime quantification data by determining an execution path connecting the end of the current critical chain such as the critical chain $L_j$, to the beginning of the following critical chain such as the critical chain $L_{j+1}$, this execution path preferably being unique. The propagation module 48 is then configured, for example, to add the execution latency of each of the software instructions forming said path between the end of the current critical chain and the beginning of the following critical chain to the limit value(s) 70, 80.

The propagation module 48 is then configured to update the pre-context field pre_v for the following critical chain, such as the critical chain $L_{j+1}$, with the result of this propagation, i.e., with the sum of the limit value(s) 70, 80 of the critical chain preceding it, i.e. the current critical chain, such as the critical chain $L_j$, and the execution latencies for the software instructions between said current critical chain and the following critical chain, said instructions between two successive critical chains being also called intermediate instructions.

As a further addition, the propagation module 48 is then configured to apply the model checking algorithm to the following critical chain, such as the critical chain $L_{j+1}$, using the result of such propagation contained in the updated pre-context field pre_v to compute the at least one limit value 70, 80 for the following critical chain, and the first limit value 70 for said following critical chain, for example, such as the value Lj+1.sh, and the second limit value 80 for said following critical chain, such as the value Lj+1.lo.

Figure 3:
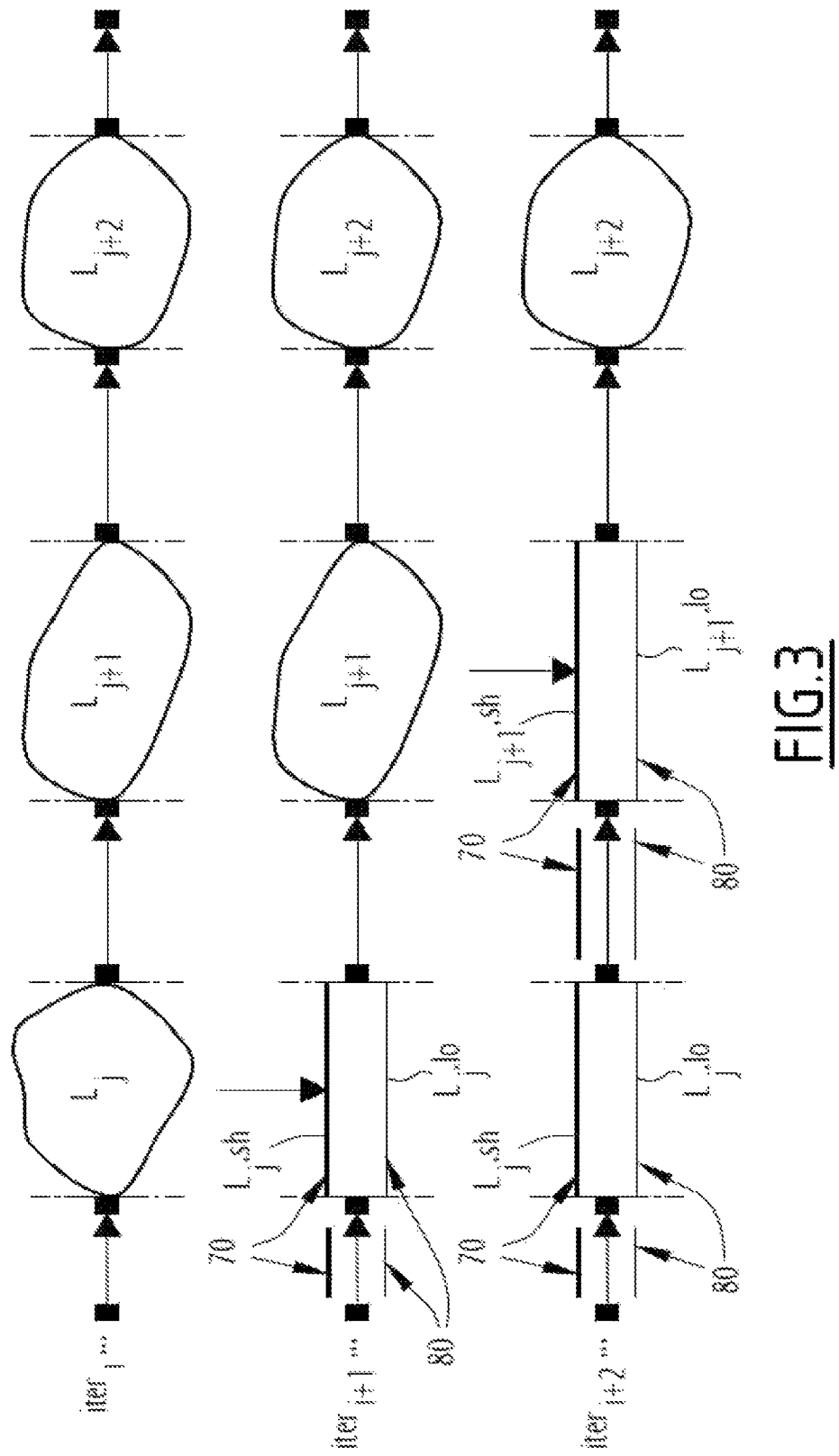
FIG. 3 is a schematic representation of a propagation of runtime quantification data of one critical chain of instructions to the following.

This runtime quantification data propagation is illustrated in FIG. 3 where the calculation module 44 is configured in a first iteration, noted $iter_i$, to calculate successive critical chains noted $L_j$, $L_{j+1}$, $L_{j+2}$ via DCSP problem solving. Then, in a subsequent iteration noted $iter_{i+1}$, the propagation module 48 is configured to compute limit values 70, 80 associated with the current critical chain, such as limit values Lj.sh, Lj.lo for the critical chain $L_j$, by implementing the model checking algorithm for said current critical chain, such as the critical chain $L_j$. Then, in a subsequent iteration, denoted $iter_{i+2}$, the propagation module 48 is configured: on the one hand, to perform the sum of the execution latencies for the software instructions lying between the end of the current critical chain, such as critical chain $L_j$, and the beginning of the following critical chain such as critical chain $_{Lj+1}$, and add this sum to the limit values 70, 80 in order to propagate these values 70, 80 from the current critical chain to the following critical chain; then, on the other hand, to implement the model checking algorithm for the following critical chain, such as the critical chain $L_{j+1}$, in order to calculate the limit value(s) 70, 80, such as the limit values Lj+1. sh, Lj+1.lo, and then taking into account the result of the previously performed time propagation contained in the updated pre-context field pre_v for the following critical chain, such as the critical chain $L_{j+1}$.

According to this optional addition, the search module 46 is then further configured to search for a possible runtime anomaly between the current critical chain and the following critical chain by checking whether the one or more limit values 70, 80 calculated for the following critical chain are consistent with the critical chain that precedes it, i.e., with the current critical chain, and typically to check whether the longest overall execution path to the following critical chain corresponding to the second limit value 80 calculated for the following critical chain, such as the value $L_{j+1}$. lo for the critical chain $L_{j+1}$, includes the software instructions of the critical chain that precedes it, i.e. of the current critical chain, such as the critical chain $L_j$.

If the longest overall execution path to the following critical chain includes the software instructions of the preceding critical chain, i.e., the current critical chain, or in other words, if the longest overall execution path to the following critical chain passes through the current critical chain, then the search module 46 is configured to determine an absence of a runtime anomaly between the current critical chain and the following critical chain. In a variant, if the longest overall execution path to the following critical chain does not contain the software instructions of the critical chain that precedes it, i.e., the current critical chain, then the search module 46 is configured to detect the presence of a runtime anomaly between the current critical chain and the following critical chain.

As a further addition, in the event of a determination of no runtime anomaly between the current critical chain and the following critical chain by the search module 46, the propagation module 48 is further configured to further propagate the runtime quantification data from one critical chain to the next, and then to perform a propagation operation by propagating the runtime quantification data from the critical chain $L_{j+1}$ to the critical chain $L_{j+2}$, and so on.

Figure 5:
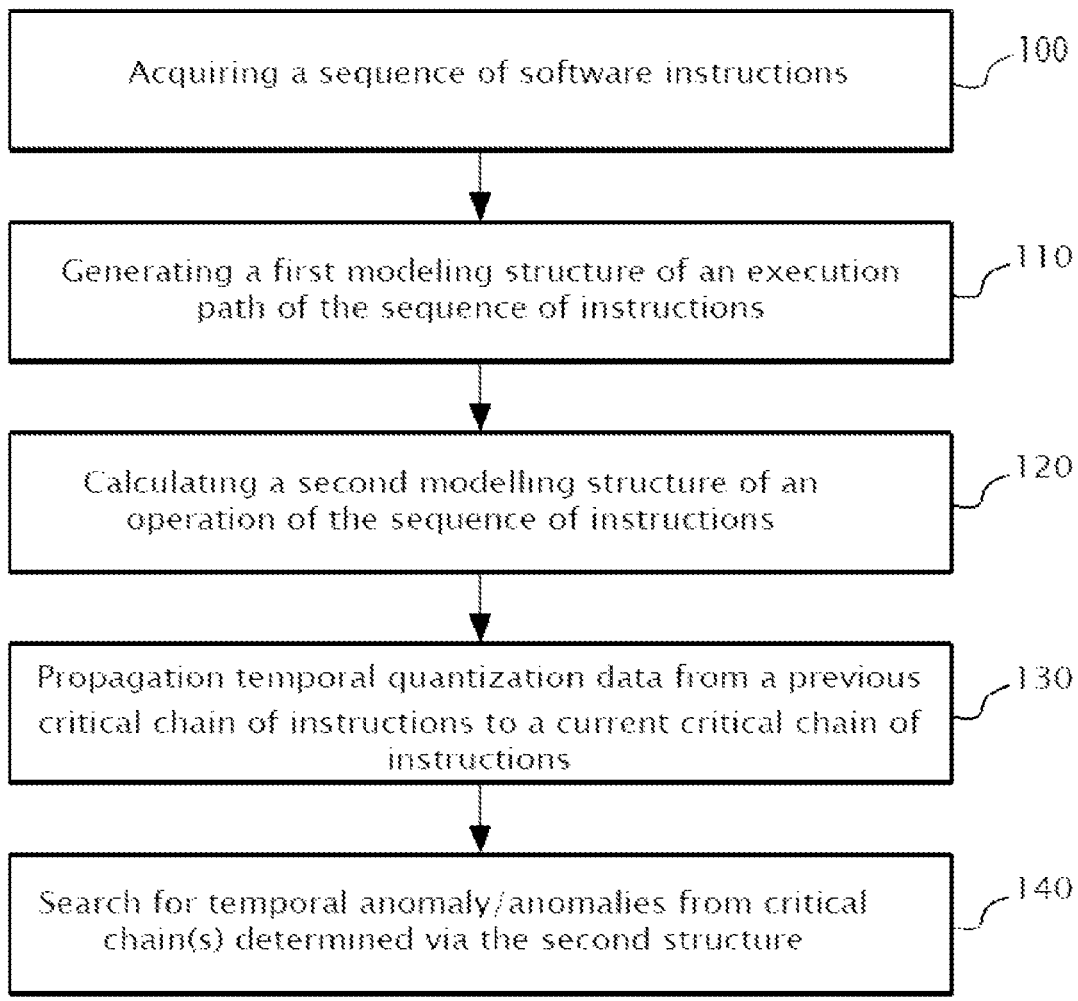
FIG. 5 is a flow chart of a method according to the invention for monitoring an executable code comprising a sequence of software instructions, the method being implemented by the electronic monitoring device of FIG. 1.

The operation of the electronic monitoring device 30 according to the invention will now be described with reference to FIG. 5, showing a flowchart of the method according to the invention, for monitoring the executable code 32 adapted to be executed on the computer platform 34.

In an initial step 100, the electronic monitoring device 30 acquires the sequence of software instructions forming the executable code 32 intended to be monitored, via its acquisition module 40. The sequence of software instructions acquired during this initial step 100 is typically a sequence of instructions, expressed in machine language, that are then directly interpretable by the computer platform 34. These software instructions are RISC-type instructions, for example, as in the example described above.

The monitoring device 30 then proceeds to the next step 110 during which the generation module 42 generates the first modeling structure modeling the execution path(s) of the sequence of instructions, the first modeling structure being generated from the sequence of instructions and including a respective first group of data for each of the software instructions of said sequence. Each respective first group includes the previous instruction identifier and the next instruction identifier for the respective software instruction associated with said first group.

In this generation step 110, each generated first group further includes the execution latency of the respective software instruction, such execution latency typically being expressed as an interval of values of numbers of clock cycles required for execution of said instruction, or, in a variant, as a given number of clock cycles required for said execution.

As an optional addition, each respective first group further comprises the identifier of the execution unit associated with the respective software instruction, such as the identifier of the implemented execution unit among the first functional unit FU1 and the second functional unit FU2 for the computer platform 34 of the example of FIG. 1.

According to this addition, the execution unit identifier is used to model the execution of software instructions on a given execution unit, the speed of execution of the instructions by a respective execution unit, or corollary execution time, or execution latency, depending on the considered execution unit. According to this addition, the identifier of the execution unit is then also taken into account when solving the degree constrained subgraph problem (DCSP) for calculation of the respective critical chain.

As a further addition, each respective first group further comprises the information of possible dependency with other instructions, such as the identifier of each register in common between the respective software instruction and said other instructions and/or the identifier of each memory area common to said other instructions, i.e. of each memory area used in common by the respective software instruction and said other instructions.

According to this addition, the possible dependency information is used to further improve the modeling of the execution path, in particular by making it possible to indicate when the software instructions are executed within the instruction sequence.

The skilled person will further observe that the sequence of instructions considered, during the complete exploration of a critical chain, is executed according to the execution mode of the computer platform, following an out-of-order mode, for example, in other words with the execution order of the sequence of instructions of the critical chain not necessarily being a sequential order.

Also, when the execution mode of the computer platform is not a sequential execution mode and the software instructions are then not executed in a sequential order, the possible dependency information is additionally taken into account when solving the degree constrained subgraph problem (DCSP) for calculation of the respective critical chain, in order to make it possible to explore different possible execution paths.

In the next step 120, the monitoring device 30 computes the second modeling structure modeling the operation of the sequence of instructions via its calculation module 44, the second structure being computed from the first modeling structure and including a respective second group of data for each of the software instructions in the sequence.

Each second group includes the membership indicator is_local in particular, indicating possible belonging to the respective instruction to a corresponding critical chain of the sequence, i.e. indicating membership, or not, of said software instruction to a respective hot spot, this indicator being typically set to the true value if the respective software instruction belongs to a critical chain, and to the false value, such as the Boolean value 0 or the FALSE value, if said respective software instruction does not belong to any critical chain. If it belongs to a respective critical chain, each second group also includes the initial instruction identifier start i.e. the identifier of the first software instruction of the respective critical chain.

In this calculation step 120, the second modeling structure is obtained from the first structure by successively going through the first groups of the first structure. Each respective critical chain corresponds to instructions of the same software function, and is typically computed by solving a DCSP problem i.e. a subgraph problem with degree constraints as described above.

In addition, for each software instruction belonging to a respective critical chain, the calculation module 44 further calculates the pre-context field pre_v and the post-context field post_v, the pre-context field pre_v including the identifier of each instruction preceding the respective software instruction and not belonging to the critical chain of which said instruction is a part, and the post-context field post_v including the identifier of each instruction succeeding the respective software instruction and not belonging to the critical chain of which said instruction is a part.

As a further addition during this step 120, the calculation module 44 calculates the at least one runtime quantification sh, lo of the execution path to the respective software instruction, and preferably both the first runtime quantification sh, equal to the runtime quantification of the shortest execution path to the respective software instruction, and the second runtime quantification lo, equal to the runtime quantification of the longest execution path to said respective instruction.

According to this addition, each execution path runtime quantification lo, sh is typically calculated from the pre_v pre-context field and the execution runtime quantifications of the instructions identified in said pre-context field, and also from the execution latency of said respective instruction.

As a further optional addition, in step 120, the calculation module 44 further calculates the scope field for each respective critical chain of instructions, this scope field making it possible in particular to prioritize between several possible critical chains associated with the same software function in order to then select the highest priority critical chain for this software function, typically the critical chain for which the scope field has the highest value, characteristic of a greater utilization of the memory resources of the computer platform 34.

As a further optional addition during this step 120, the calculation module 44 also calculates the variability field var for each respective critical chain. This variability field var includes the pre-context variable, for example, equal to the most frequent identifier of the instruction identifiers contained in the pre-context fields pre_v for said critical chain and thus making it possible to identify the software instruction most likely to be executed prior to said critical chain, and/or the post-context variable, equal to the most frequent identifier of the instruction identifiers contained in the post-context fields post_v for said critical chain, making it possible in a similar way to identify the software instruction most likely to be executed subsequent to said critical chain.

In a following optional step 130, the propagation module 48 propagates the runtime quantification data from a current critical chain of instructions to the following critical chain, and from critical chain $L_j$ to critical chain $L_{j+1}$ for example. This propagation of runtime quantification data is performed by first implementing the model checking algorithm for the current critical chain such as critical chain $L_j$ for example, to compute the limit value(s) 70, 80, such as the first limit value 70, also noted as Lj.sh and corresponding to the shortest overall execution path to critical chain $L_j$, and the second limit value 80, also noted as Lj.lo and corresponding to the longest execution path to critical chain $L_j$. The propagation module 48 then propagates the limit value(s) 70, 80 thus calculated to the following critical chain, such as the critical chain $L_{j+1}$, by adding to them the execution latencies of the intermediate software instructions included between the end of the current critical chain, such as the critical chain $L_j$, and the beginning of the following critical chain, such as the critical chain $L_{j+1}$.

The monitoring device 30 finally searches, during step 140 and via its search module 46, for one or more runtime anomalies from the critical instruction chains determined via the second structure of the modeling during the calculation step 120. This search for runtime anomaly/anomalies is typically performed by searching for possible inconsistencies between the runtime quantifications associated with the current critical chain and those associated with the following critical chain, for example by searching for possible inconsistencies between the runtime quantifications of the critical chains $L_j$ and $L_{j+1}$, and then during a subsequent iteration between those of the critical chains $L_{j+1}$ and $L_{j+2}$.

In addition, when the runtime quantification data has been propagated from a current critical chain to the next one in the optional step 130, for example from the critical chain $L_j$ to the critical chain $L_{j+1}$ as shown in FIG. 3, the search module 46 will preferably search for the presence of possible runtime anomaly/anomalies by checking whether the longest overall execution path to a respective critical chain, such as the $L_{j+1}$ chain, contains the software instructions of the previous critical chain, such as the Lj critical chain, and then determines, if necessary, an absence of runtime anomaly/anomalies. This verification is typically performed by comparison of a sorted list of the identifiers of the software instructions forming the longest overall execution path to the critical chain $L_{j+1}$ with the list of software instructions forming the critical chain $L_j$ that precedes it.

According to this addition, further to this verification, if the search module 46 concludes on the contrary that the longest overall execution path up to the critical chain $L_{j+1}$ does not pass through the critical chain $L_j$ that precedes it, i.e. does not contain all the software instructions of said critical chain $L_j$, then the search module 46 determines the presence of a runtime anomaly between the critical chains Lj and $L_{j+1}$. If so, the search module 46 preferably generates an alert, in order to signal said runtime anomaly.

If no runtime anomaly has been found in the search step 140 between the critical chains Lj and $L_{j+1}$, then the monitoring device 30 returns to the optional step 130, for example, in order to perform a new propagation of runtime quantification data from one critical chain to the next, in this case from the critical chain $L_{j+1}$ to the critical chain $L_{j+2}$, and then goes again to the search step 140 to search for the presence of possible runtime anomaly/anomalies between the critical chains $L_{j+1}$ and $L_{j+2}$, and so on.

Thus, the monitoring device 30 and monitoring method according to the invention make it possible to automatically determine the critical instruction chain(s), also called hot spots, for the sequence of software instructions forming the monitored executable code 32 from the second modeling structure calculated by the calculation module 44, with this second structure itself obtained from the first modeling structure generated by the generation module 42.

The monitoring device 30 and the monitoring method according to the invention then make it possible to additionally search for the presence of one or more possible runtime anomalies associated with the execution of the sequence of instructions forming said executable code 32, from the critical instruction chains determined via the second modeling structure and typically from the runtime quantifications of the execution paths associated with each of these critical instruction chains.

It is thus conceived that the monitoring device 30 and the monitoring method according to the invention allow for automatic and easy detection of possible runtime anomalies.

The invention claimed is:

1. A method for monitoring an executable code adapted to be executed on a computer platform, the executable code comprising a sequence of software instructions, the method being implemented by an electronic monitoring device and comprising:

acquiring the sequence of software instructions;

generating a first modeling structure of an execution path of the sequence of instructions, with the first structure being generated from the sequence of instructions and including a plurality of first groups of data, each of the first groups of data being associated with a respective software instruction and including an identifier of a previous instruction and an identifier of a following instruction;

calculating a second modelling structure of an operation of the sequence of instructions, the second structure comprising a plurality of second groups of data, each of the second groups of data being associated with the respective software instruction and comprising an indicator of possibly belonging to a specific critical chain of instructions, and in a case of belonging to a respective critical chain, of a plurality of respective chains, an identifier of an initial instruction of said respective critical chain;

the second structure being created from the first structure by successively going through the first groups of data;

computing the respective critical chain, of the plurality of respective chains, corresponding to instructions of a same software function, by solving a subgraph problem with degree constraints, each of the plurality of respective critical chains corresponding to a subgraph, a number of instructions included in each of the plurality of respective critical chains being less than or equal to a predefined maximum number, and an optimization parameter being a number of relationships between the instructions included in each of the respective critical chains, said number of relationships corresponding to a number of arcs in a related subgraph; and searching for runtime anomaly/anomalies from one or more critical chains of instructions determined via the second modeling structure.

2. The method according to claim 1, wherein during the calculating, for each software instruction belonging to the respective critical chain, each of the second groups of data further comprises a pre-context field and a post-context field, with the pre-context field including an identifier of each instruction preceding the instruction associated with said second groups of data and not belonging to the respective critical chain of which said each instruction is a part, and the post-context field including an identifier of each instruction succeeding an instruction associated with one of said second groups of data and not belonging to the critical chain of which said instruction is a part.

3. The method according to claim 2, wherein during the calculating, a scope field is added for each of the one or more respective critical chains of instructions in the second modeling structure, the scope field including a number of memory accesses from all instructions in said respective critical chain.

4. The method according to claim 2, wherein during the calculating, a pre-context variable and a post-context variable are added for each of the one or more respective critical chain chains of instructions in the second modeling structure, the pre-context variable being equal to the most frequent of the instruction identifiers contained in the pre-context fields for said respective critical chain, and the post-context variable being equal to the most frequent of the instruction identifiers contained in the post-context fields for said respective critical chain.

5. The method according to claim 1, wherein each of the first groups of data further comprises a runtime quantification of an execution of the respective software instruction, and each of the second groups of data further comprises at least a runtime quantification of an execution path of the sequence to said respective software instruction.

6. The method according to claim 5, wherein the runtime quantification of the execution of the respective software instruction is a number of clock cycles for said execution.

7. The method according to claim 5, wherein during the calculating, for each software instruction belonging to one of the plurality of respective critical chains, each of the second groups of data further comprises a pre-context field and a post-context field, with the pre-context field including an identifier of each instruction preceding an instruction associated with one of said second groups of data and not belonging to the critical chain of which said associated instruction is a part, and the post-context field including an identifier of each instruction succeeding the instruction associated with one of said second groups of data and not belonging to the critical chain of which said associated instruction is a part, and wherein each runtime quantification of an execution path to the respective software instruction is calculated from the pre-context field for said instruction and the execution runtime quantifications for said respective instruction and for the instructions identified in the pre-context field.

8. The method according to claim 5, wherein the method further comprises propagating runtime quantification data from a previous critical chain of instructions to a current critical chain of instructions, runtime quantifications associated with the current critical chain being determined from runtime quantifications associated with the previous critical chain.

9. The method according to claim 8, wherein during the searching, a runtime anomaly is detected if there is an inconsistency between the runtime quantifications associated with the current critical chain and the runtime quantifications associated with the previous critical chain.

10. The method according to claim 5, wherein a first runtime quantification included in the second groups of data is a runtime quantification of a shortest execution path between a first instruction of the sequence and the respective instruction; and a second runtime quantification included in the second groups of data is a runtime quantification of a longest execution path between said first instruction and the respective instruction.

11. The method according to claim 1, wherein the computer platform comprises a plurality of instructions execution units, and each of the first groups of data further comprises an identifier of an execution unit associated with the respective software instruction.

12. The method according to claim 1, wherein each of the first groups of data further comprises information on possible dependency with other instructions.

13. The method according to claim 12, wherein the information on possible dependency includes a common register identifier with said other instructions and/or a common memory area identifier with said other instructions.

14. The method according to claim 1, wherein the sequence of software instructions is a sequence of instructions expressed in machine language, directly interpretable by the computer platform.

15. A non-transitory computer-readable medium including a computer program comprising software instructions that implement a method according to claim 1 when executed by a computer.

16. An electronic device for monitoring an executable code adapted to be executed on a computer platform, the executable code comprising a sequence of software instructions, the device comprising:
- an acquisition module configured to acquire the sequence of software instructions;
- a generation module configured to generate a first modeling structure of an execution path of the sequence of instructions, the first structure being generated from the sequence of instructions and including a plurality of first groups of data, each of the first groups of data being associated with a respective software instruction; each of the first groups of data including an identifier of a previous instruction and an identifier of a following instruction;
- a calculation module configured to calculate a second structure for modelling an operation of the sequence of instructions, the second structure comprising a plurality of second groups of data, each of the second data groups of data being associated with the respective software instruction; each of the second groups of data comprising an indicator of possibly belonging to a specific critical chain of instructions, and in a case of belonging to a respective critical chain, of a plurality of respective critical chains, an identifier of an initial instruction of said respective critical chain;
- the second structure being created from the first structure by successively going through the first groups of data;
- the respective critical chain, of the plurality of respective critical chains, corresponding to instructions of a same software function and being computed by solving a subgraph problem with degree constraints, each of the plurality of respective critical chains corresponding to a subgraph, a number of instructions included in each of the plurality of respective critical chains being less than or equal to a predefined maximum number, and an optimization parameter being a number of relationships between the instructions included in each of the respective critical chains, said number of relationships corresponding to a number of arcs in a related subgraph; and
- a search module configured to search for one or more runtime anomalies from one or more critical chains of instructions determined via the second modeling structure.

* * * * *